(12) United States Patent
Iwamura et al.

(10) Patent No.: US 11,853,025 B2
(45) Date of Patent: *Dec. 26, 2023

(54) LADDER DIAGRAM PROGRAM CREATION ASSISTANCE DEVICE, LADDER DIAGRAM PROGRAM CREATION ASSISTANCE METHOD, AND NON-TRANSITORY COMPUTER READABLE RECORDING MEDIUM

(71) Applicant: OMRON Corporation, Kyoto (JP)

(72) Inventors: Shintaro Iwamura, Otsu (JP); Shuichi Kobayashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 118 days.

This patent is subject to a terminal disclaimer.

(21) Appl. No.: 17/432,942

(22) PCT Filed: Feb. 27, 2020

(86) PCT No.: PCT/JP2020/007914
§ 371 (c)(1),
(2) Date: Aug. 23, 2021

(87) PCT Pub. No.: WO2020/184195
PCT Pub. Date: Sep. 17, 2020

(65) Prior Publication Data
US 2022/0171360 A1    Jun. 2, 2022

(30) Foreign Application Priority Data
Mar. 12, 2019    (JP) .................................. 2019-044374

(51) Int. Cl.
*G05B 19/05*    (2006.01)
*G06F 9/44*    (2018.01)

(52) U.S. Cl.
CPC ............. *G05B 19/056* (2013.01); *G06F 9/44* (2013.01); *G05B 2219/13004* (2013.01); *G05B 2219/13052* (2013.01); *G05B 2219/13115* (2013.01)

(58) Field of Classification Search
CPC ....................................................... G06F 9/44
(Continued)

(56) References Cited

U.S. PATENT DOCUMENTS

| 10,928,803 B2 * | 2/2021 | Biernat .............. G05B 19/4093 |
| 2009/0007000 A1 * | 1/2009 | Hasegawa ............ G05B 19/056 700/87 |

(Continued)

FOREIGN PATENT DOCUMENTS

| CN | 105074592 | 11/2015 |
| JP | H044403 | 1/1992 |

(Continued)

OTHER PUBLICATIONS

"Search Report of Europe Counterpart Application", dated Nov. 22, 2022, p. 1-p. 9.

(Continued)

*Primary Examiner* — Md Azad
(74) *Attorney, Agent, or Firm* — JCIPRNET

(57) ABSTRACT

A partial circuit selector selects a partial circuit comprising a plurality of contacts in a ladder diagram program. A replacement circuit generator generates a replacement circuit comprising a smaller number of contacts than in the selected partial circuit. An auxiliary circuit generator generates an auxiliary circuit that causes the replacement circuit to perform the same action as the partial circuit. A program editor performs, on the ladder diagram program, a replacement process for replacing a partial circuit appearing in the ladder diagram program with the replacement circuit, and (Continued)

performs an auxiliary circuit insertion process for inserting the auxiliary circuit into the ladder diagram program.

12 Claims, 15 Drawing Sheets

(58) Field of Classification Search
USPC .......................................................... 700/18
See application file for complete search history.

(56) References Cited

U.S. PATENT DOCUMENTS

| | | | | |
|---|---|---|---|---|
| 2015/0286204 | A1* | 10/2015 | Yamaoka | G05B 19/056 700/86 |
| 2016/0034259 | A1* | 2/2016 | Yamaoka | G06F 8/30 717/107 |
| 2016/0378866 | A1* | 12/2016 | Matsuo | G06F 16/951 707/722 |
| 2018/0314224 | A1* | 11/2018 | Matsuo | G05B 19/056 |
| 2019/0236233 | A1* | 8/2019 | Horikawa | G05B 19/0426 |
| 2022/0198113 | A1* | 6/2022 | Tomonaga | G06F 30/27 |

FOREIGN PATENT DOCUMENTS

| | | |
|---|---|---|
| JP | H05282394 | 10/1993 |
| JP | H06131011 | 5/1994 |
| JP | H09198110 | 7/1997 |
| JP | 2007272679 | 10/2007 |
| JP | 2008033913 | 2/2008 |
| JP | 2017207962 | 11/2017 |
| WO | 2014136240 | 9/2014 |
| WO | 2014155717 | 10/2014 |
| WO | 2018051441 | 3/2018 |

OTHER PUBLICATIONS

"International Search Report (Form PCT/ISA/210) of PCT/JP2020/007914," dated Apr. 28, 2020, with English translation thereof, pp. 1-5.

"Written Opinion of the International Searching Authority (Form PCT/ISA/237) of PCT/JP2020/007914," dated Apr. 28, 2020, with English translation thereof, pp. 1-9.

"Office Action of Japan Counterpart Application", dated Aug. 1, 2023, with English translation thereof, p. 1-p. 6.

"Office Action of China Counterpart Application", dated Nov. 8, 2023, with English translation thereof, p. 1-p. 14.

* cited by examiner

LADDER DIAGRAM PROGRAM CREATION ASSISTANCE DEVICE, LADDER DIAGRAM PROGRAM CREATION ASSISTANCE METHOD, AND NON-TRANSITORY COMPUTER READABLE RECORDING MEDIUM

CROSS-REFERENCE TO RELATED APPLICATION

This application is a 371 application of the International PCT application serial no. PCT/JP2020/007914, filed on Feb. 27, 2020, which claims the priority benefit of Japan Patent Application No. 2019-044374, filed on Mar. 12, 2019. The entirety of each of the above-mentioned patent applications is hereby incorporated by reference herein and made a part of this specification.

TECHNICAL FIELD

The present invention relates to a technique for assisting in creation of a ladder diagram program to be executed by a programmable controller (PLC) or the like.

RELATED ART

Conventionally, a ladder diagram program to be executed by a programmable controller (PLC) is often created by a general-purpose computer such as a personal computer and uploaded to the PLC. On the general-purpose computer, a program for executing a creation function of creating a ladder diagram program, an editing function of editing a ladder diagram program, an upload function of uploading a ladder diagram program to the PLC, and a download function of downloading a ladder diagram program from the PLC is installed.

As a device assisting in creation of a ladder diagram program, there is one described in Patent Document 1. The device of Patent Document 1 aims to easily and quickly perform an operation of converting a part of a ladder diagram program into a function block program (FB program). In the device, when an operator selects an area in the ladder diagram program that is desired to be converted into an FB program, a guide screen for variable definitions necessary to convert the selected area into the FB program is generated and displayed. In the device, based on the content of each variable defined by the operator according to the display of the guide screen, the FB program for the selected area is generated. Further, on the guide screen of the device, variable type of each variable is defined according to variable type information obtained based on an operand of each instruction contained in the ladder diagram program of the selected area and known information.

PRIOR-ART DOCUMENTS

Patent Documents

Patent Document 1: Japanese Laid-open No. 2008-33913

SUMMARY OF THE INVENTION

Problems to be Solved by the Invention

However, a ladder diagram program in which the same partial circuit repeatedly appears becomes more complex as its scale increases, and readability and debugging efficiency thereof are reduced. The partial circuit mentioned herein is composed of multiple contacts. A contact is the smallest unit of a ladder diagram program having a logical meaning.

An object of the present invention is to provide a technique for easily editing a ladder diagram program in which the same partial circuit repeatedly appears into a ladder diagram program with improved readability and debugging efficiency.

Means for Solving the Problems

A ladder diagram program creation assistance device of the present invention is configured as follows in order to achieve the above object.

A partial circuit selector selects a partial circuit including multiple contacts in a ladder diagram program. A replacement circuit generator generates a replacement circuit including a smaller number of contacts than the partial circuit selected by the partial circuit selector. An auxiliary circuit generator generates an auxiliary circuit that causes the replacement circuit generated by the replacement circuit generator to perform the same action as the partial circuit selected by the partial circuit selector.

A program editor performs, on the ladder diagram program, a replacement process for replacing a partial circuit appearing in the ladder diagram program with the replacement circuit generated by the replacement circuit generator, and an auxiliary circuit insertion process for inserting the auxiliary circuit generated by the auxiliary circuit generator into the ladder diagram program.

Therefore, by selecting the partial circuit including multiple contacts, the partial circuit can be replaced with the replacement circuit including fewer contacts. Since the auxiliary circuit is inserted into the ladder diagram program, the replaced replacement circuit can be caused to perform the same action as the corresponding partial circuit. Accordingly, readability and debugging efficiency of the ladder diagram program can be improved.

The partial circuit selector may be configured to select, as the partial circuit, a circuit including multiple contacts that are input and specified. The partial circuit selector may also be configured to extract in the ladder diagram program, as the partial circuit, a circuit including multiple contacts and appearing more than a predetermined number of times. In this case, the partial circuit selector may be configured to display the extracted partial circuit, present it to the operator and cause the operator to select the partial circuit to be replaced with the replacement circuit, or may be configured to select the extracted partial circuit as the partial circuit to be automatically replaced with the replacement circuit.

An auxiliary circuit output part may be additionally provided that, when the replacement circuit replaced by the program editor in the replacement process is selected in the ladder diagram program, outputs an auxiliary circuit corresponding to the selected replacement circuit. With such a configuration, the operator may easily confirm the auxiliary circuit corresponding to the replacement circuit, and the partial circuit.

The program editor may be configured to, if a step including a coil of a contact belonging to the partial circuit selected by the partial circuit selector appears in the ladder diagram program, prohibit replacement of the partial circuit appearing after this step with the replacement circuit in the replacement process. With such a configuration, the occurrence of a bug in the ladder diagram program due to replacement of the partial circuit with the replacement circuit can be prevented (a difference in action state between a partial circuit and a replacement circuit that replaces the partial circuit can be prevented).

The program editor may be configured to, if a step including a coil of a contact belonging to the partial circuit selected by the partial circuit selector appears in the ladder diagram program, insert the auxiliary circuit generated by the auxiliary circuit generator between the step and a step in which the partial circuit first appears after the step in the auxiliary circuit insertion process. With such a configuration, the occurrence of a bug in the ladder diagram program due to replacement of the partial circuit with the replacement circuit can also be prevented.

The program editor may be configured to, when a step including a coil of a contact belonging to the partial circuit replaced with the replacement circuit is added to the ladder diagram program, replace a replacement circuit appearing after the added step with the corresponding partial circuit. With such a configuration, the operator may perform editing for adding a step to the ladder diagram program without caring whether it is a ladder diagram program that has been edited to replace a partial circuit with a replacement circuit.

The program editor may be configured to, when a step including a coil of a contact belonging to the partial circuit replaced with the replacement circuit is added to the ladder diagram program, insert the auxiliary circuit generated by the auxiliary circuit generator immediately after the added step. With such a configuration, the operator may also perform editing for adding a step to the ladder diagram program without caring whether it is a ladder diagram program that has been edited to replace a partial circuit with a replacement circuit.

Effects of the Invention

According to the present invention, a ladder diagram program in which the same partial circuit repeatedly appears can be easily edited into a ladder diagram program with improved readability and debugging efficiency.

Figure 5:
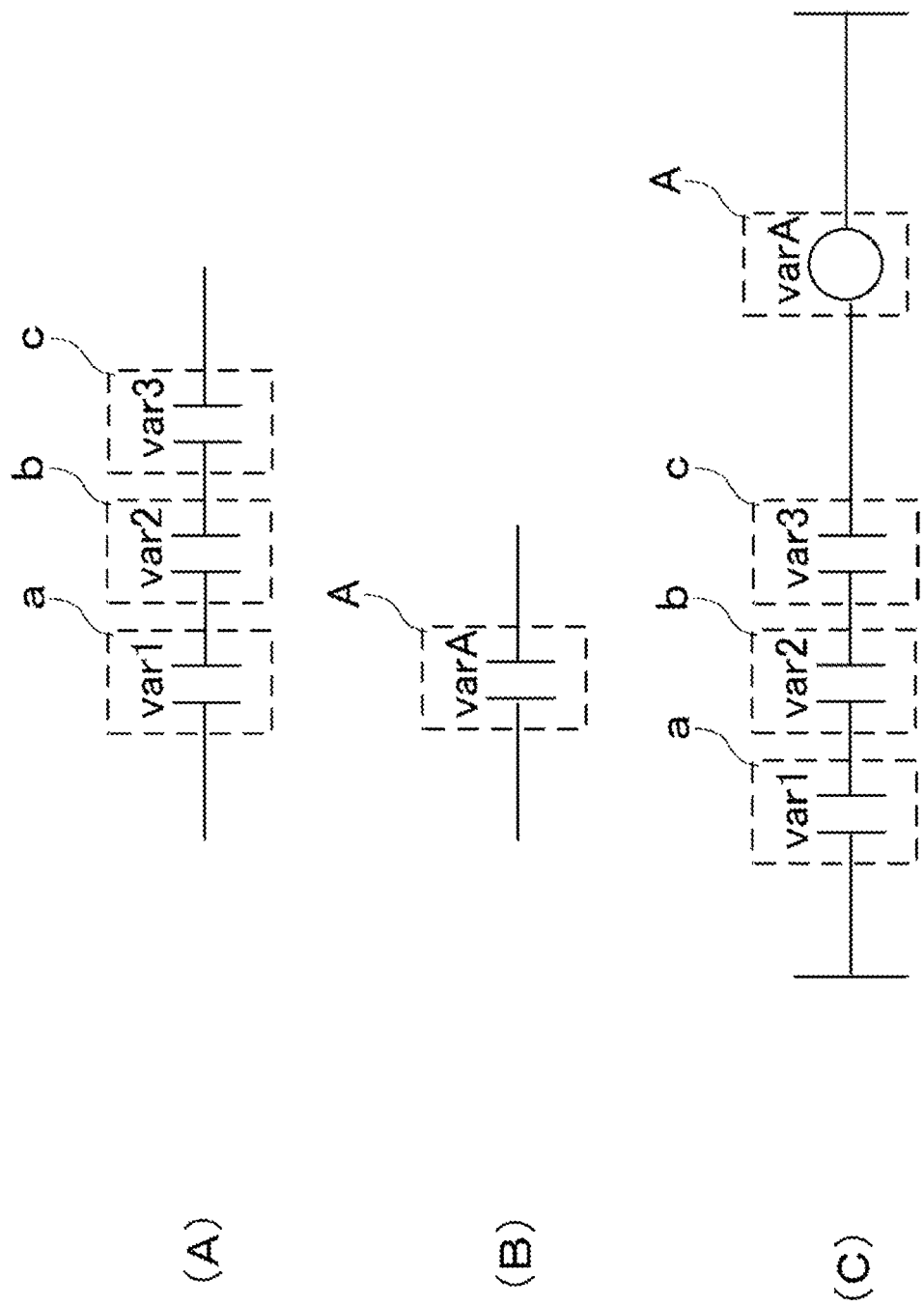

(A) of FIG. 5 illustrates a partial circuit, (B) of FIG. 5 illustrates a replacement circuit, and (C) of FIG. 5 illustrates an auxiliary circuit.

Figure 6:
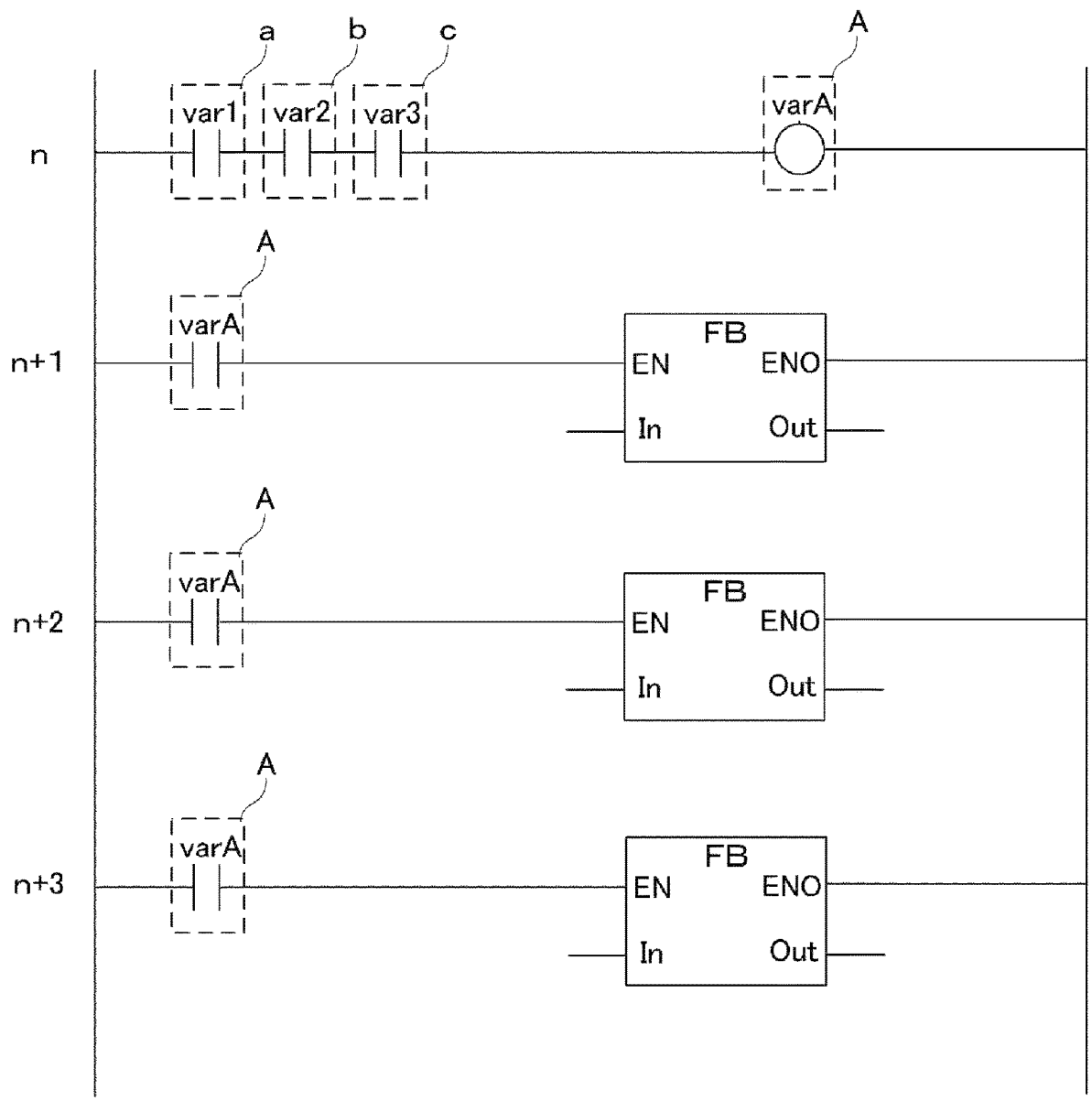

FIG. 6 illustrates an edited ladder diagram program.

Figure 7:
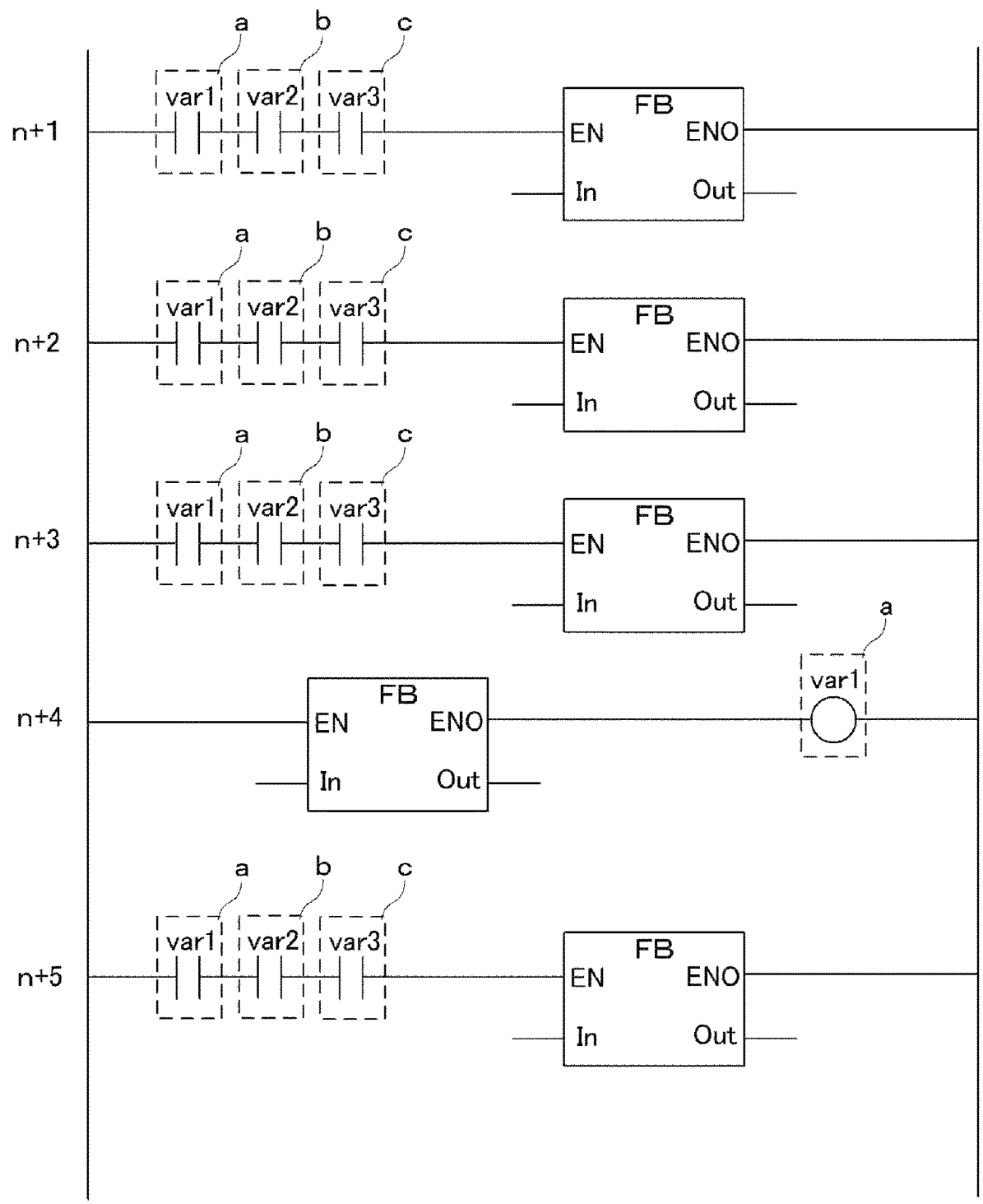

FIG. 7 illustrates a ladder diagram program according to another example.

Figure 8:
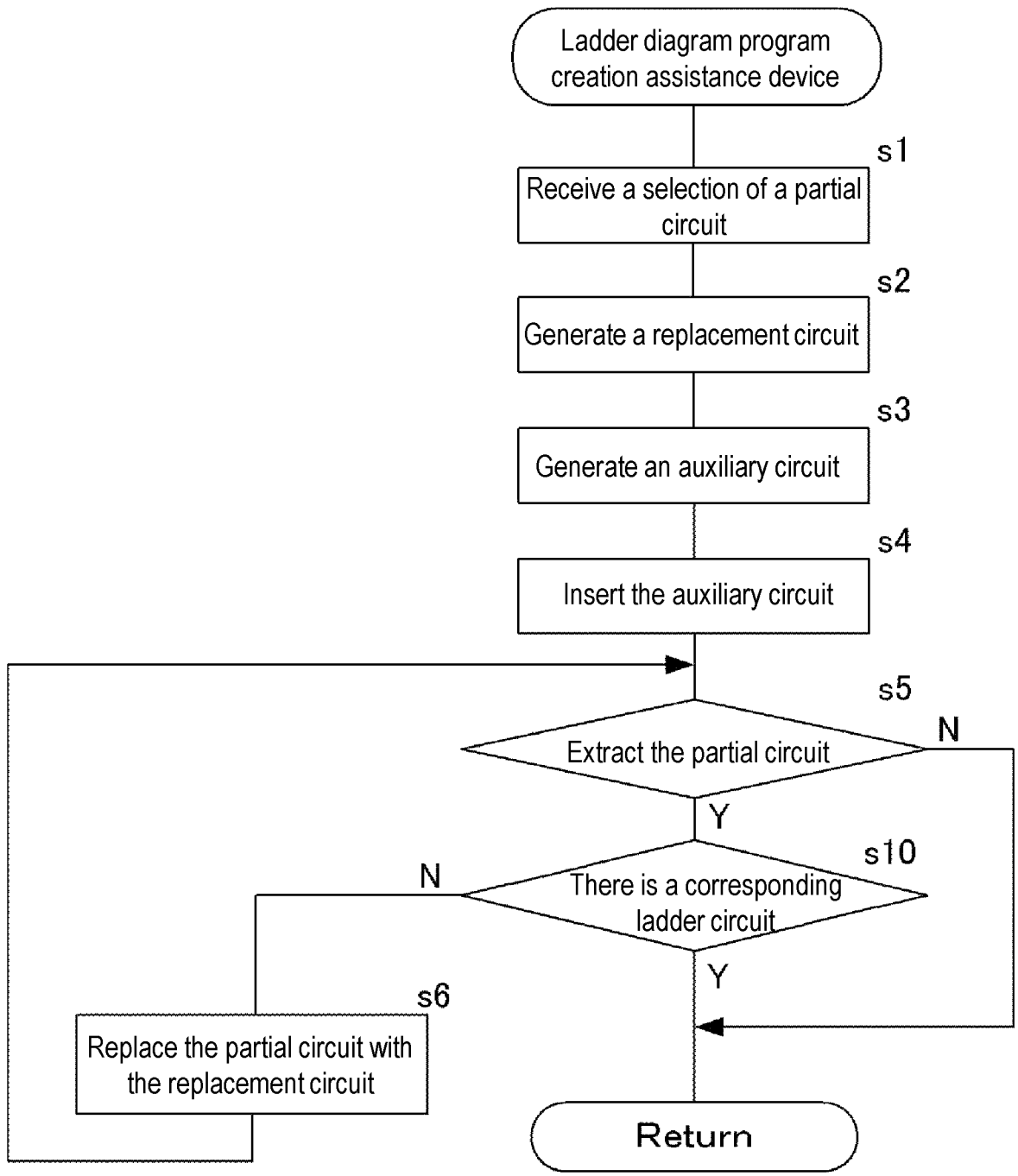

FIG. 8 is a flowchart showing an operation of a ladder diagram program creation assistance device according to another example.

Figure 9:
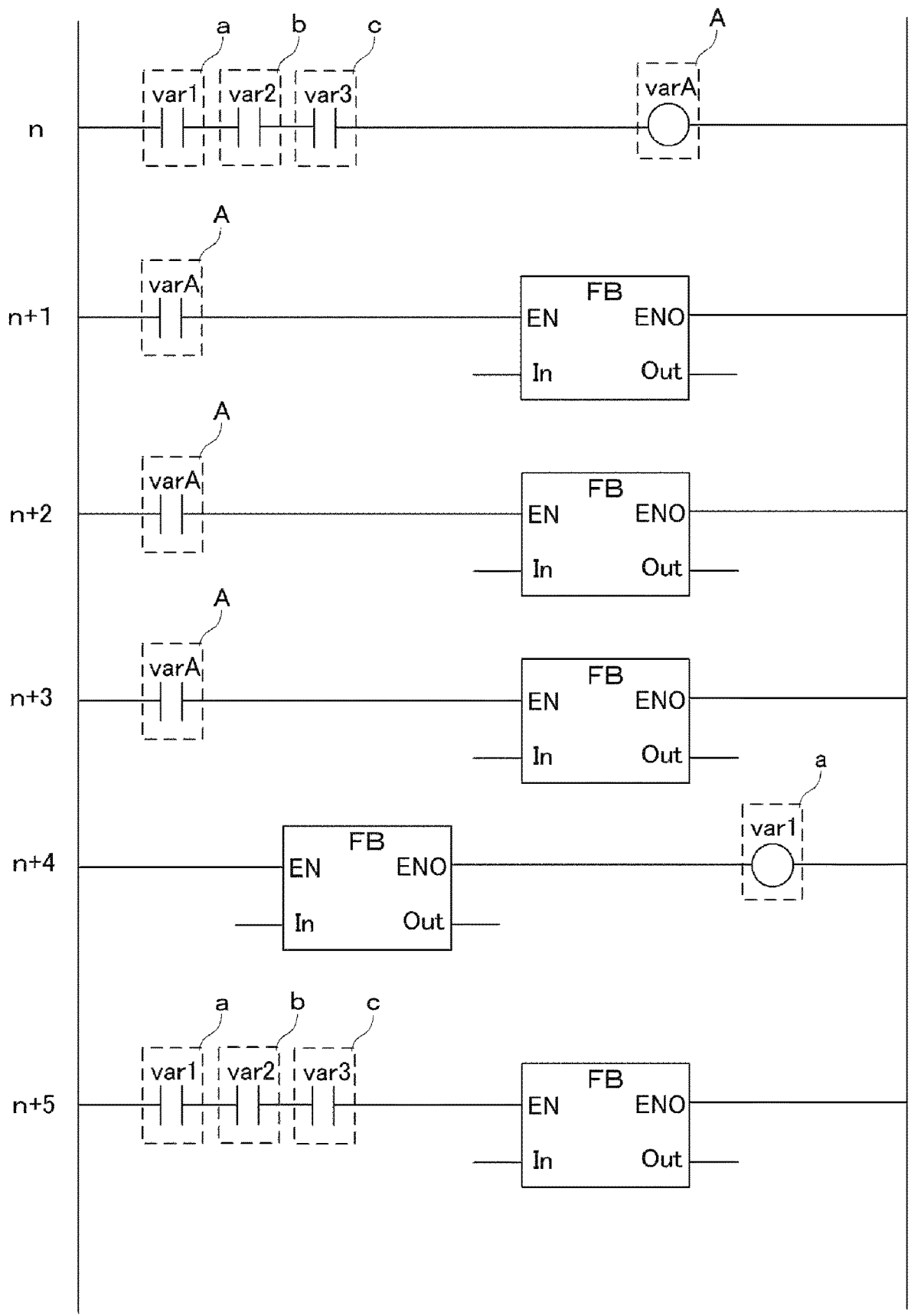

FIG. 9 illustrates a ladder diagram program edited by a ladder diagram program creation assistance device according to another example.

Figure 10:
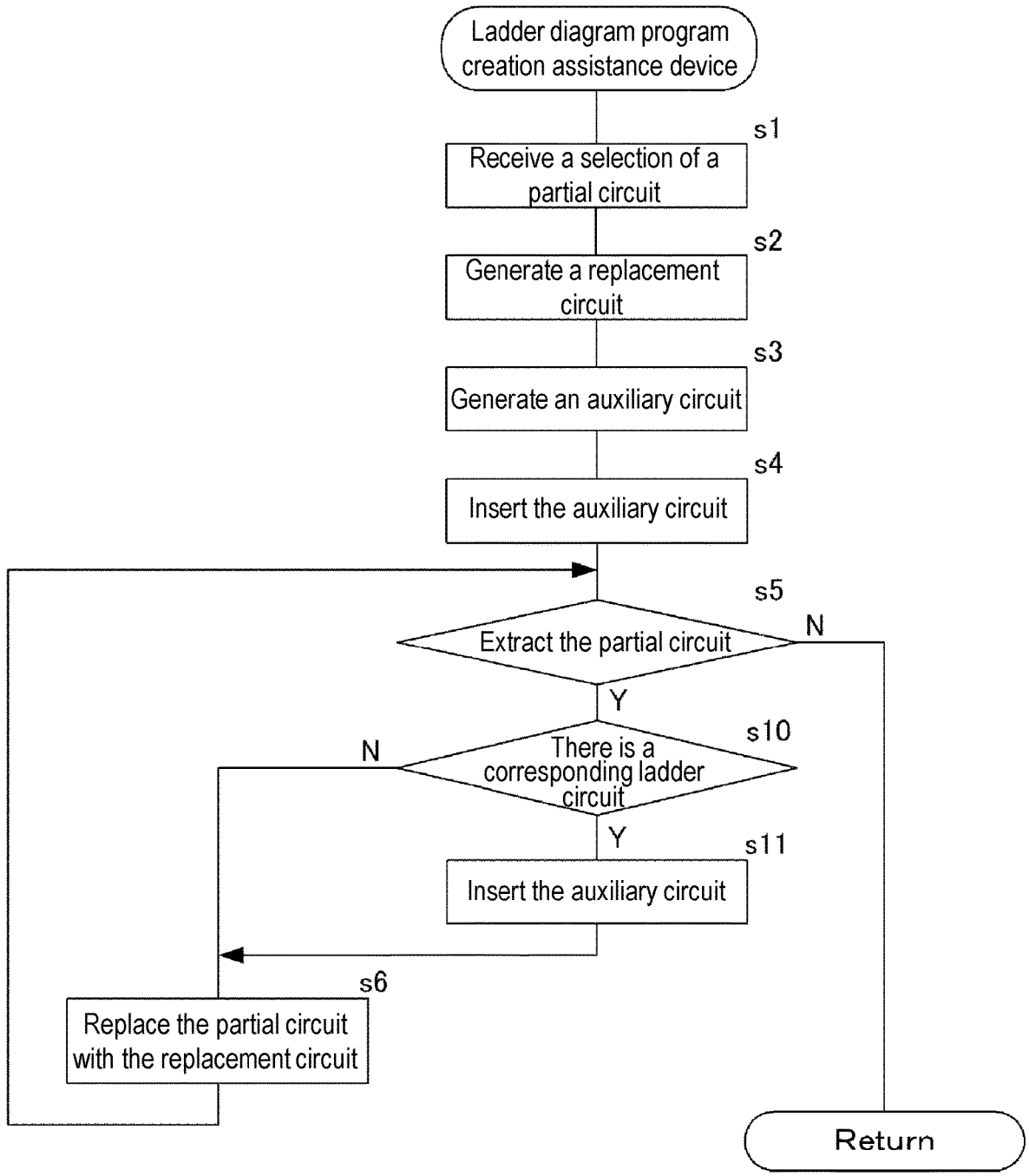

FIG. 10 is a flowchart showing an operation of a ladder diagram program creation assistance device according to another example.

Figure 11:
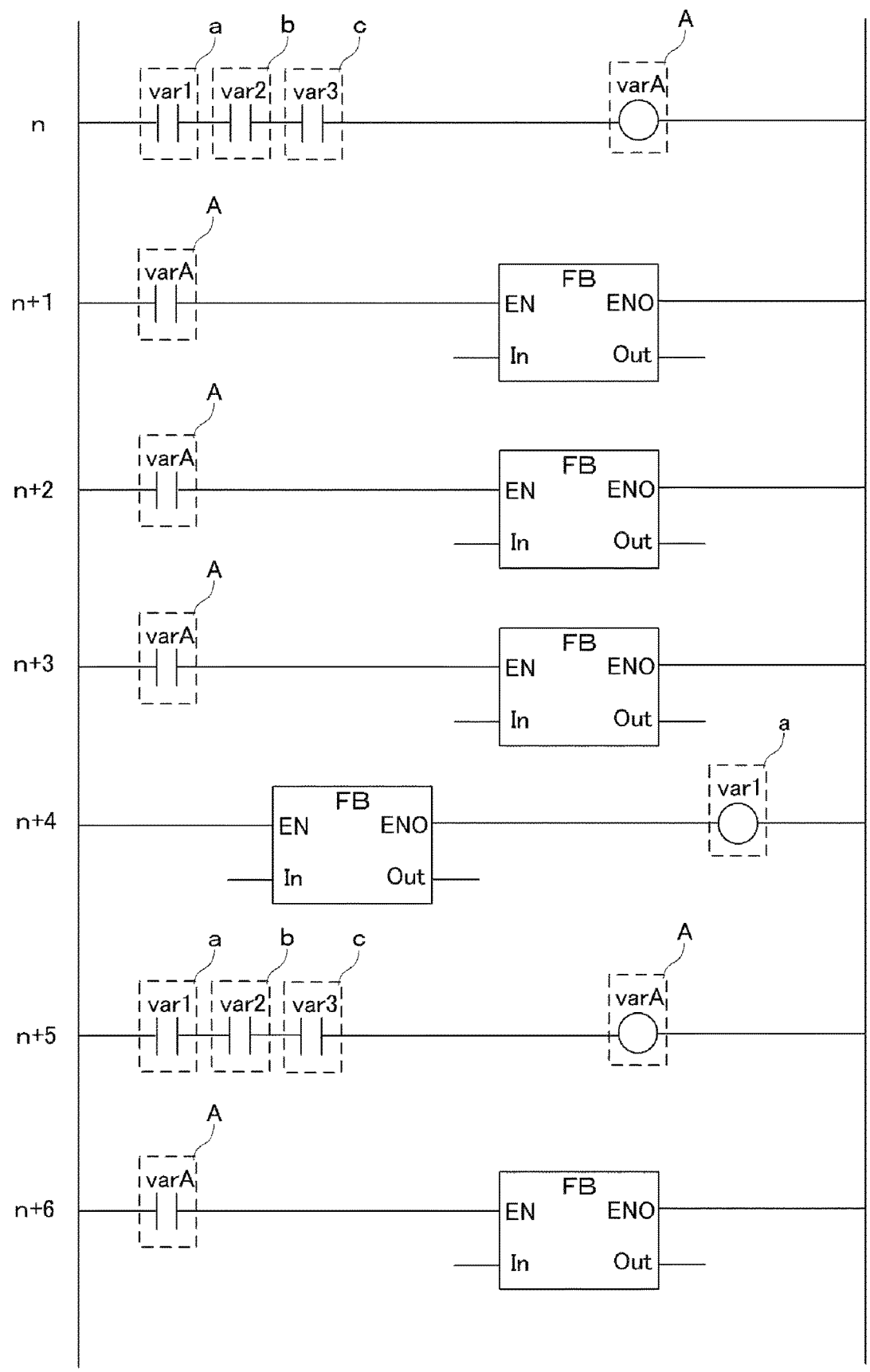

FIG. 11 illustrates a ladder diagram program edited by a ladder diagram program creation assistance device according to another example.

Figures 12, 13:
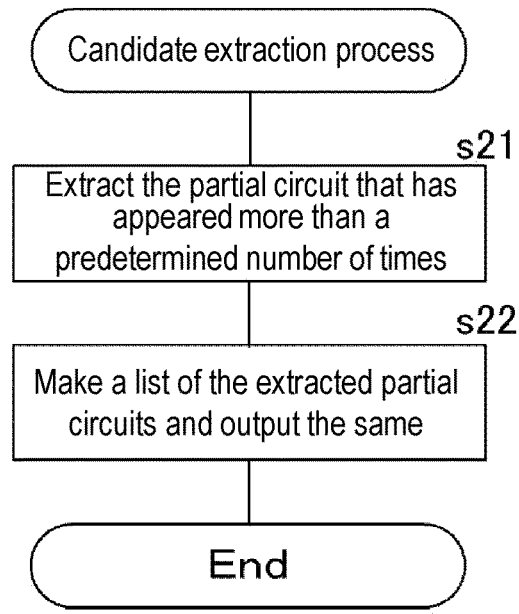

FIG. 12 is a flowchart showing a candidate extraction process.

FIG. 13 illustrates a display example of a processing result of a candidate extraction process.

Figure 14:
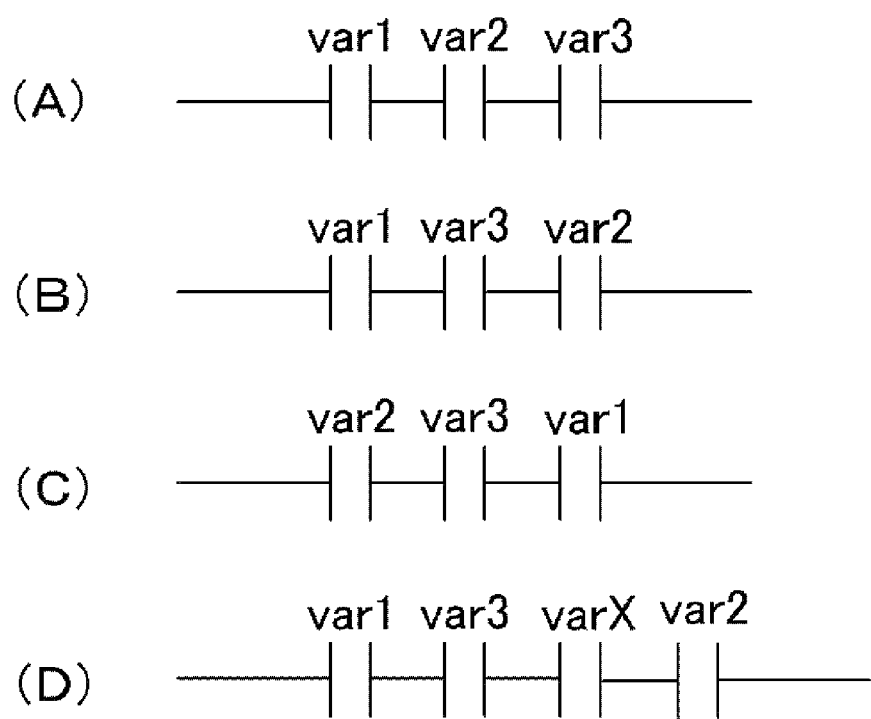

(A) to (D) of FIG. 14 are diagrams describing partial circuits that are determined to be the same.

Figure 15:
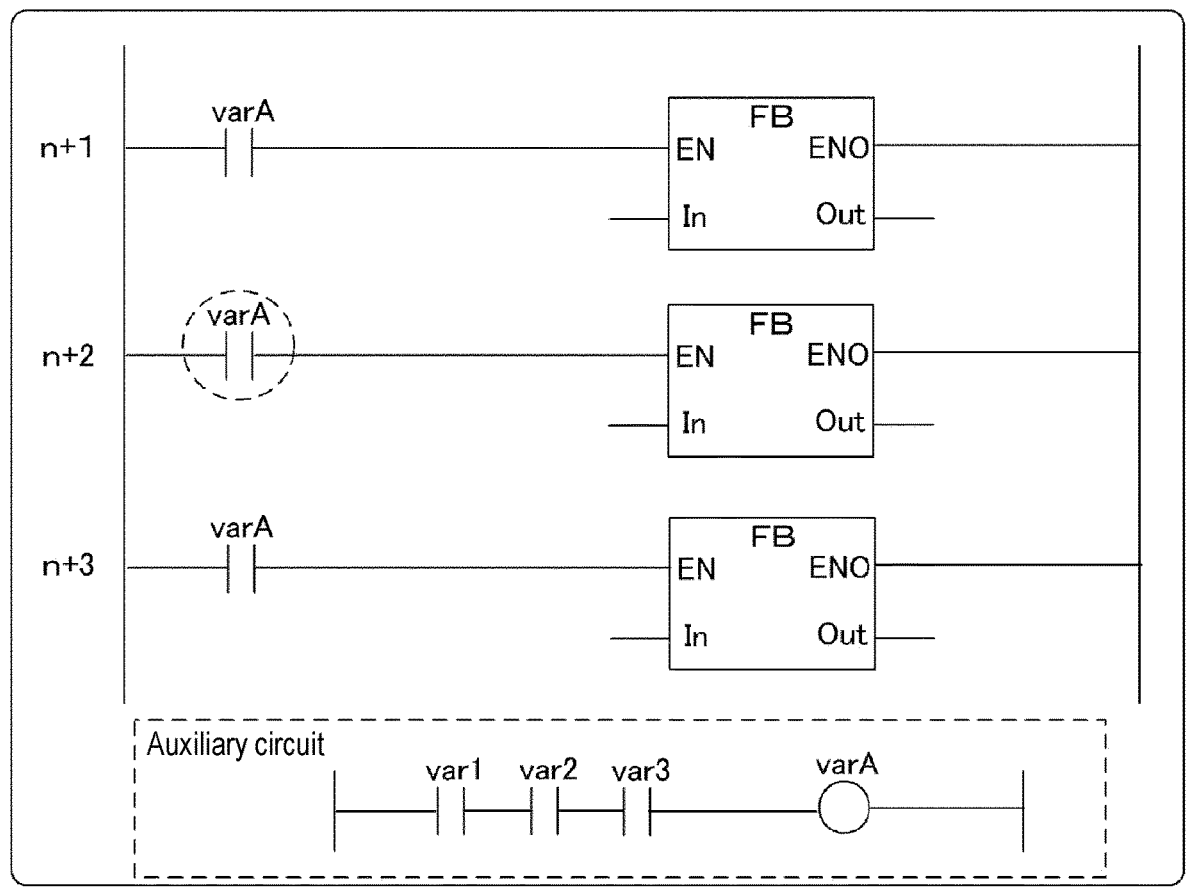

FIG. 15 illustrates an example of a display screen of a display part.

Figure 16:
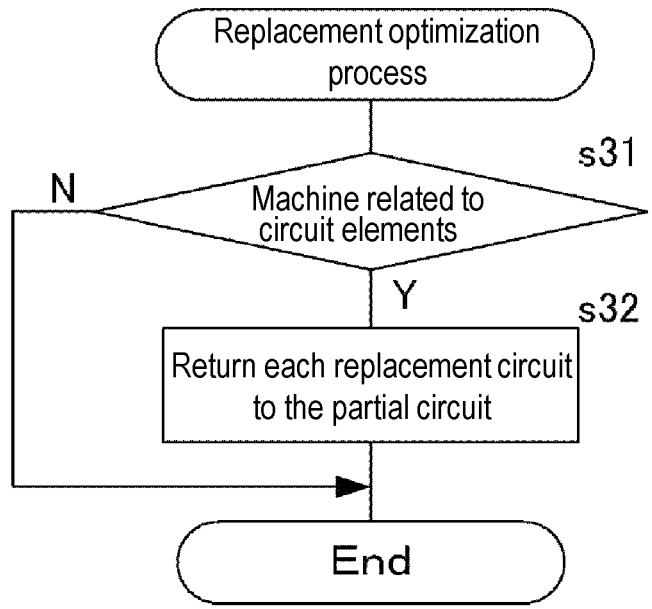

FIG. 16 is a flowchart showing a replacement optimization process.

Figure 17:
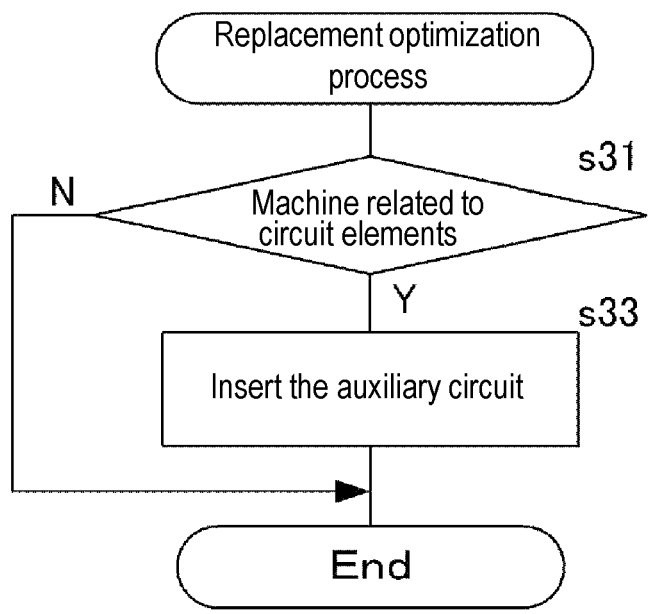

FIG. 17 is a flowchart showing a replacement optimization process according to another example.

DESCRIPTION OF THE EMBODIMENTS

Hereinafter, a ladder diagram program creation assistance device being an embodiment of the present invention is described.

Figure 1:
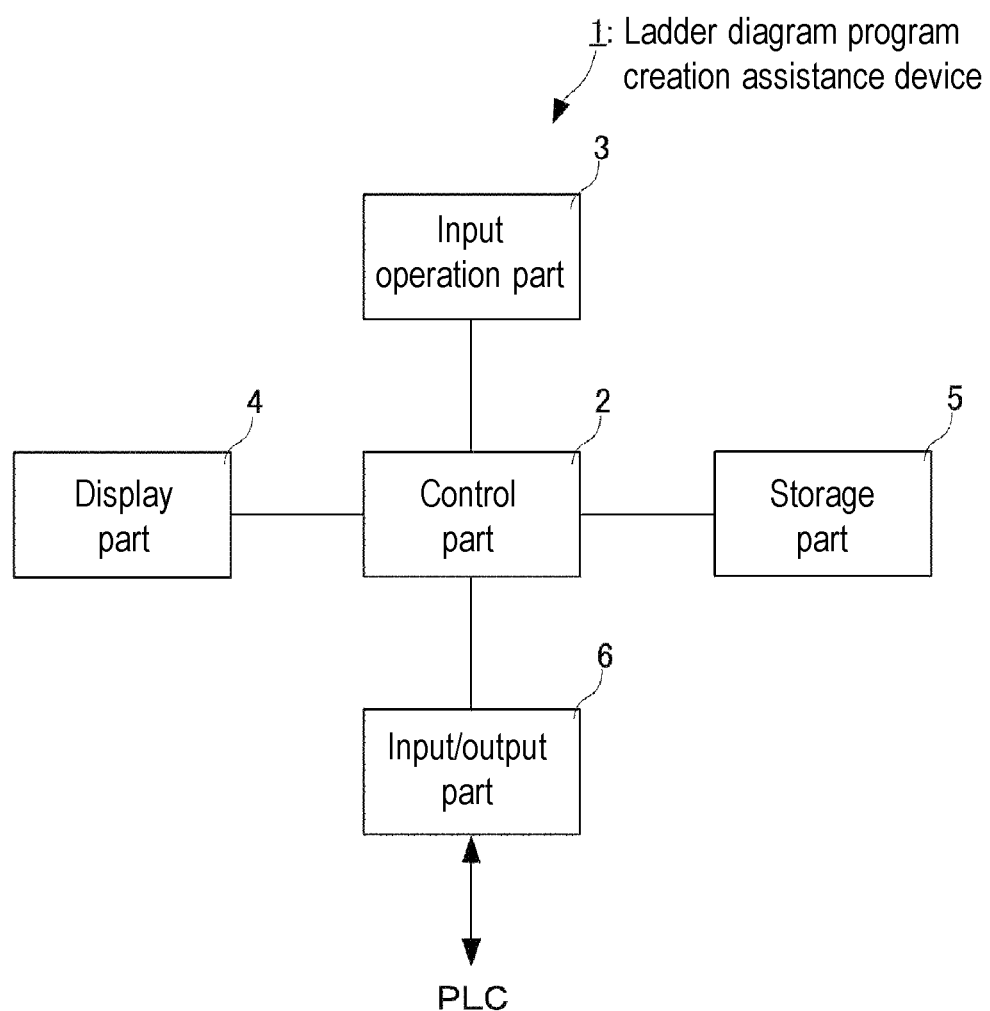
FIG. 1 is a block diagram showing a configuration of main parts of a ladder diagram program creation assistance device.

FIG. 1 is a block diagram showing a configuration of main parts of the ladder diagram program creation assistance device according to this example. A ladder diagram program creation assistance device 1 of this example includes a control part 2, an input operation part 3, a display part 4, a storage part 5, and an input/output part 6. The ladder diagram program creation assistance device 1 can be realized by a general-purpose computer installed with a program for executing a creation function of creating a ladder diagram program, an editing function of editing a ladder diagram program, an upload function of uploading a ladder diagram program to a PLC, and a download function of downloading a ladder diagram program from a PLC. The computer executes a ladder diagram program creation assistance method according to the present invention. A ladder diagram program creation assistance program according to the present invention is installed on the computer.

The control part 2 controls operations of each part of a main body of the ladder diagram program creation assistance device 1.

The input operation part 3 has an input device such as a keyboard or a mouse, and receives an input corresponding to an operation performed on the input device by an operator.

The display part 4 has a display device such as a display, and displays a ladder diagram program being processed at that time or a state of the main body of the ladder diagram program creation assistance device 1 at that time.

The storage part 5 has a storage medium such as a hard disk or a memory, and stores programs, data, ladder diagram programs or the like necessary for the operations of the main body of the ladder diagram program creation assistance device 1.

The input/output part 6 performs input and output of a ladder diagram program (uploading or downloading of a ladder diagram program) with a programmable controller (PLC) (not shown).

Figure 2:
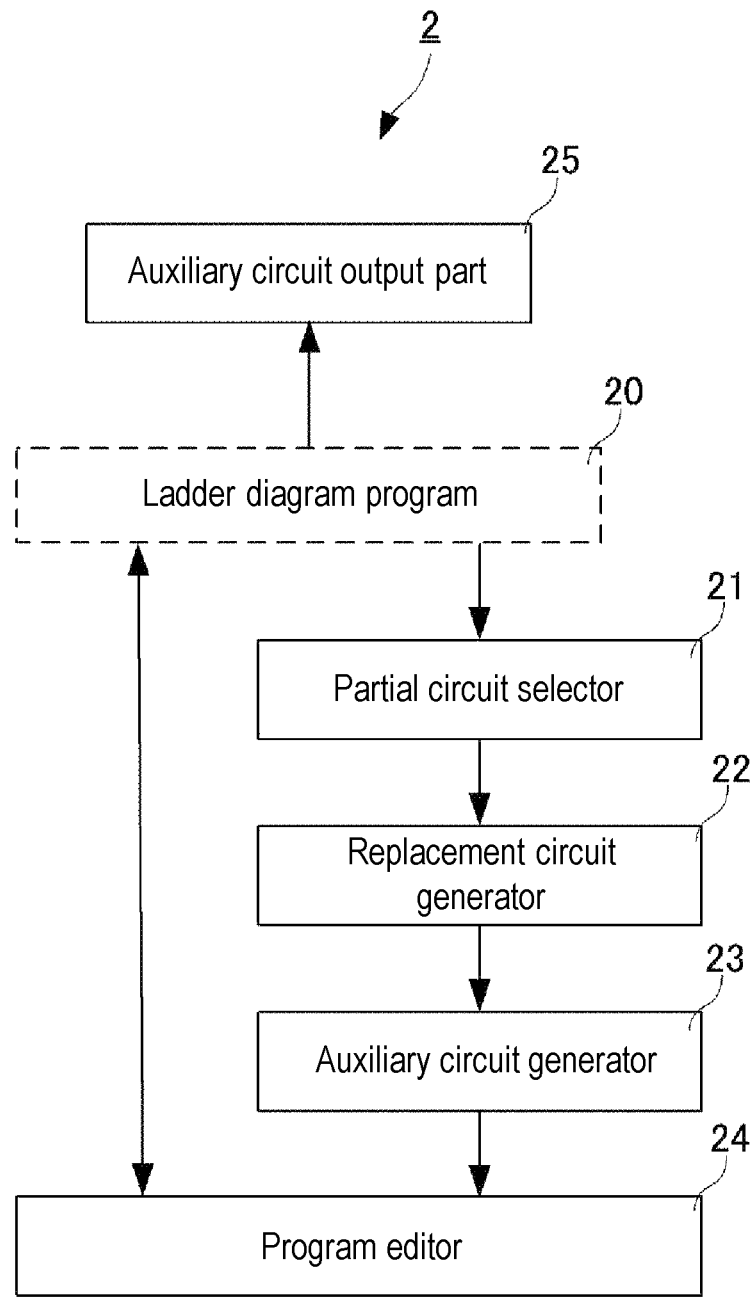
FIG. 2 is a block diagram showing a functional configuration of a control part.

FIG. 2 is a block diagram showing a functional configuration of a control part. The control part 2 includes a partial circuit selector 21, a replacement circuit generator 22, an auxiliary circuit generator 23, a program editor 24, and an auxiliary circuit output part 25. A ladder diagram program 20 shown in FIG. 2 is a program being processed at that time, and is developed in the control part 2.

The partial circuit selector 21 selects a partial circuit including multiple contacts in the ladder diagram program 20 being processed at that time. That is, the partial circuit selected by the partial circuit selector 21 includes multiple contacts. A contact is the smallest unit of a ladder diagram program having a logical meaning, and is a variable.

The replacement circuit generator 22 generates a replacement circuit including fewer contacts than the partial circuit selected by the partial circuit selector 21. The replacement circuit is preferably a circuit including a single contact.

The auxiliary circuit generator 23 generates an auxiliary circuit that causes the replacement circuit generated by the replacement circuit generator 22 to perform the same action as the partial circuit selected by the partial circuit selector 21.

The program editor 24 performs various editing processes on the ladder diagram program 20. For example, the program editor 24 performs a replacement process for replacing a partial circuit appearing in the ladder diagram program 20 with a replacement circuit. In addition, the program editor 24 performs an auxiliary circuit insertion process for inserting the auxiliary circuit generated by the auxiliary circuit generator 23 in an appropriate place in the ladder diagram program 20. In the auxiliary circuit insertion process, the replacement circuit generated by the replacement circuit generator 22 and replaced in the replacement process is inserted in a place where the replacement circuit performs the same action as the corresponding partial circuit.

The auxiliary circuit output part 25 outputs an auxiliary circuit corresponding to the selected replacement circuit. The auxiliary circuit output by the auxiliary circuit output part 25 is displayed on a display or the like of the display part 4.

Hereinafter, the operations of the ladder diagram program creation assistance device 1 according to this example are described.

Figure 3:
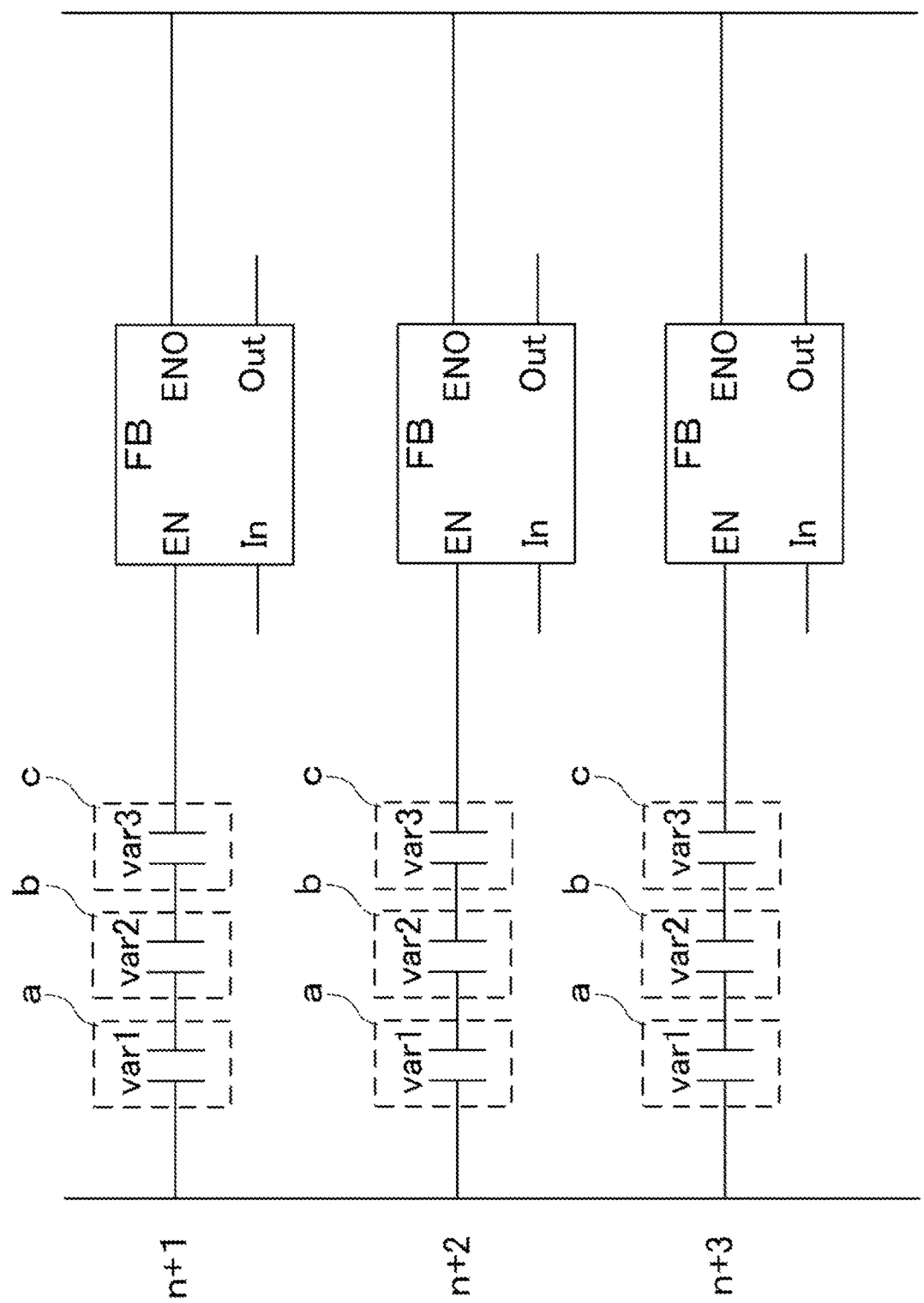
FIG. 3 illustrates a ladder diagram program.

FIG. 3 illustrates a ladder diagram program. FIG. 3 shows a part (three steps, from n+1 step to n+3 step) of the ladder diagram program 20. One step is a ladder circuit. That is, the ladder diagram program 20 is composed of one or more ladder circuits.

In the ladder diagram program 20 shown in FIG. 3, in the three ladder circuits of the n+1 step, the n+2 step, and the n+3 step, a partial circuit appears in which contact a, contact b, and contact c are connected in series. A partial circuit is some of circuit elements that constitute a ladder circuit (a ladder circuit is not composed of one partial circuit). Contact a is variable var1, contact b is variable var2, and contact c is variable var3. The FB shown in FIG. 3 is a function block.

Figure 4:
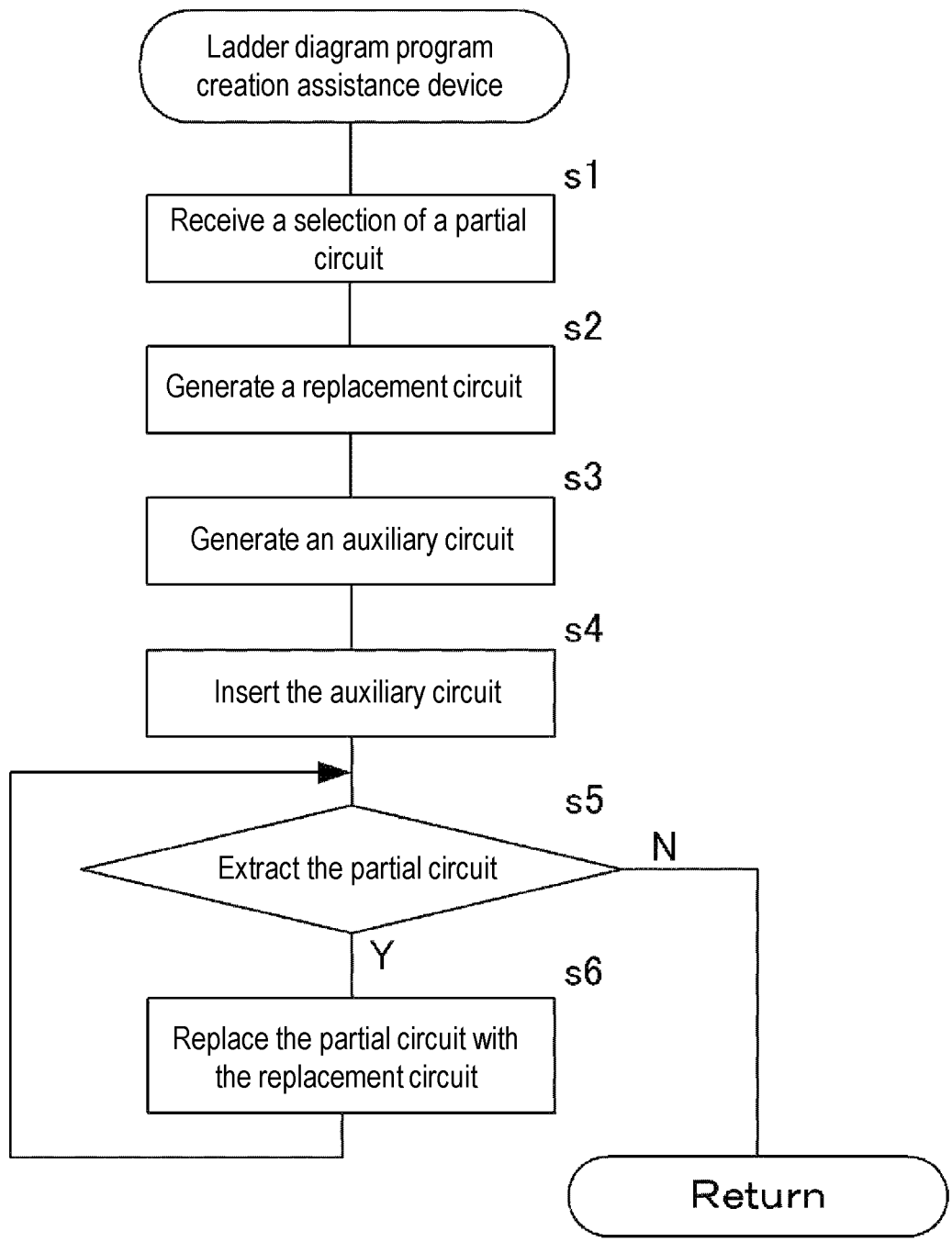
FIG. 4 is a flowchart showing an operation of a ladder diagram program creation assistance device.

FIG. 4 is a flowchart showing an operation of a ladder diagram program creation assistance device of this example. In the ladder diagram program creation assistance device 1, the ladder diagram program 20 shown in FIG. 3 is displayed on the display of the display part 4. The operator operates the input device (such as a mouse) of the input operation part 3 and selects a partial circuit to be edited. For example, the operator confirms a partial circuit that repeatedly appears in the ladder diagram program 20 (the ladder diagram program 20 displayed on the display) to be processed, and selects the partial circuit. The partial circuit selected by the operator includes multiple contacts. In other words, the operator is unable to select a single contact as a partial circuit.

When the partial circuit selector 21 receives the operator's selection of the partial circuit (s1), the replacement circuit generator 22 generates a replacement circuit that replaces the partial circuit whose selection is received this time (s2). Here, an example is given in which the operator selects, as the partial circuit, a circuit in which contact a, contact b, and contact c are connected in series. In s2, the replacement circuit is generated, composed of a smaller number of contacts than the number (here, three, including contact a, contact b, and contact c) of contacts belonging to the partial circuit received this time. For example, if the partial circuit is a circuit including multiple contacts, the replacement circuit is set as a circuit including one contact A. Here, contact A is regarded as variable varA. The replacement circuit generated in s2 is a circuit capable of performing the same action as the partial circuit selected in s1.

The replacement circuit may be composed of two or more contacts. However, the condition is that the number of contacts constituting the replacement circuit is smaller than the number of contacts constituting the partial circuit.

The auxiliary circuit generator 23 generates an auxiliary circuit for causing the replacement circuit generated by the replacement circuit generator 22 in s2 to perform the same action as the partial circuit whose selection is received in s1 (s3). For example, in the case where the partial circuit (see (A) of FIG. 5 in which contact a, contact b, and contact c are connected in series is selected, and contact A (see (B) of FIG. 5) is generated as the replacement circuit for the partial circuit, the auxiliary circuit generator 23 generates an auxiliary circuit shown in (C) of FIG. 5. As illustrated, this auxiliary circuit is a circuit in which contact a, contact b and contact c connected in series are connected in series with a coil A of contact A. The auxiliary circuit is used as one step of the ladder diagram program 20. That is, the auxiliary circuit is a ladder circuit.

With respect to the ladder diagram program 20 to be processed, the program editor 24 inserts the auxiliary circuit generated in s3 into a step immediately before the partial circuit whose selection is received in s1 (s4). For example, in the case where the circuit in which contact a, contact b, and contact c are connected in series, which appears in the ladder circuit of the n+1 step shown in FIG. 3, is selected as the partial circuit, the program editor 24 inserts the auxiliary circuit generated in s3 into n step of the ladder diagram program 20 to be processed (actually, the inserted auxiliary circuit becomes the ladder circuit of the n+1 step in the ladder diagram program 20 to be processed, and step numbers of the subsequent ladder circuits are counted up one by one).

When the program editor 24 searches the ladder diagram program 20 to be processed for steps after the step in which the auxiliary circuit is inserted in s4 in order, and extracts the ladder circuit (step) in which the partial circuit whose selection is received in s1 (s5), the program editor 24 replaces the partial circuit appearing in the ladder circuit extracted here with the replacement circuit generated in s2 (s6). The program editor 24 repeats the processes of s5 and s6. If the ladder circuit in which the partial circuit whose selection is received in s1 appears cannot be extracted from the ladder diagram program 20 to be processed (when the processes related to s5 and s6 are completed for a ladder circuit being the last step of the ladder diagram program 20 to be processed), the program editor 24 ends the present process.

For example, in the ladder diagram program 20 of FIG. 3, the program editor 24 replaces the partial circuit (circuit in which contact a, contact b, and contact c are connected in series) appearing in the ladder circuits of the steps n+1, n+2, and n+3 with the replacement circuit (contact A) in order. FIG. 6 illustrates the ladder diagram program 20 obtained by editing the ladder diagram program 20 shown in FIG. 3 by the above-described process. Therefore, in the ladder diagram program 20, a partial circuit including multiple contacts can be easily replaced with a replacement circuit including a smaller number of contacts. Accordingly, readability and debugging efficiency of the ladder diagram program 20 can be improved.

Next, another example of a ladder diagram program creation assistance device is described. The hardware of the ladder diagram program creation assistance device 1 according to this another example is the same as that of the above example. The ladder diagram program creation assistance device 1 according to this another example is different from the above example in that a process shown in later-described FIG. 8 is performed instead of the process shown in FIG. 4.

FIG. 7 illustrates another example of a ladder diagram program. The ladder diagram program 20 shown in FIG. 7 is obtained by adding n+4 step and n+5 step to the ladder diagram program shown in FIG. 3. The n+4 step is a ladder circuit including a coil a of contact a. The n+5 step is a ladder circuit in which a partial circuit in which contact a, contact b, and contact c are connected in series appears, like the n+1 step to the n+3 step.

FIG. 8 is a flowchart showing an operation of a ladder diagram program creation assistance device of this another example. In FIG. 8, the same step numbers (s #) are assigned to the same processes as those in FIG. 4. The ladder diagram program creation assistance device 1 according to this another example also executes the above processes of s1 to s5.

When the ladder circuit in which the partial circuit whose selection is received in s1 appears is extracted from the ladder diagram program 20 to be processed in s5, the program editor 24 performs the processes shown below.

The program editor 24 determines whether there is a ladder circuit (corresponding ladder circuit) that includes a coil of a contact belonging to the partial circuit between the step in which the auxiliary circuit is inserted in s4 and the ladder circuit extracted in s5 this time in which the partial circuit appears in the ladder diagram program 20 to be processed (s10). If there is no corresponding ladder circuit, the program editor 24 replaces the partial circuit appearing in the ladder circuit extracted this time with the replacement circuit generated in s2 (s6). When determining in s10 that there is a corresponding ladder circuit, the program editor 24 ends the present process without replacing the partial circuit appearing in the ladder circuit extracted this time with the replacement circuit generated in s2.

For example, in the ladder diagram program 20 of FIG. 7, the program editor 24 replaces the partial circuit (circuit in which contact a, contact b, and contact c are connected in series) appearing in the ladder circuits of the steps n+1, n+2, and n+3 with the replacement circuit (contact A). However, since the step n+4 is a ladder circuit including a coil of contact a belonging to the partial circuit whose selection is received this time, the program editor 24 cannot replace the partial circuit appearing in the ladder circuit of the step n+5 with the replacement circuit (contact A). FIG. 9 illustrates the ladder diagram program 20 obtained by editing the ladder diagram program 20 shown in FIG. 7 by the above-described process. Therefore, even if the ladder diagram program 20 is edited by the process shown in FIG. 8, in the edited ladder diagram program (ladder diagram program shown in FIG. 9), no bug occurs in the step n+5.

Further, another example of a ladder diagram program creation assistance device is described. The hardware of the ladder diagram program creation assistance device 1 according to this another example is the same as that of the above two examples. The ladder diagram program creation assistance device 1 according to this another example is different from the above examples in that a process shown in FIG. 10 is performed instead of the process shown in FIG. 4 or FIG. 8.

FIG. 10 is a flowchart showing an operation of a ladder diagram program creation assistance device according to this another example. In FIG. 10, the same step numbers (s #) are assigned to the same processes as those in FIG. 4 or FIG. 8. In the ladder diagram program creation assistance device 1 according to this another example, the program editor 24 also executes the above processes of s1 to s5. In s10, the program editor 24 determines whether there is a ladder circuit (corresponding ladder circuit) that includes a coil of a contact belonging to the partial circuit between the step in which the auxiliary circuit is inserted in s4 and the ladder circuit extracted in s5 this time in which the partial circuit appears in the ladder diagram program 20 to be processed. If there is no corresponding ladder circuit, the program editor 24 replaces the partial circuit appearing in the ladder circuit extracted this time with the replacement circuit generated in s2 (s6). When determining in s10 that there is a corresponding ladder circuit, the program editor 24 inserts the auxiliary circuit generated in s3 into a step immediately before the ladder circuit extracted in s5 this time (s11). Further, the program editor 24 replaces the partial circuit of the ladder circuit extracted this time in s5 with the replacement circuit generated in s2 (s6). The program editor 24 repeats the processes related to s5, s6, s10 and s11. If the ladder circuit in which the partial circuit whose selection is received in s1 appears cannot be extracted from the ladder diagram program 20 to be processed in s5, the program editor 24 ends the present process.

A position where the auxiliary circuit is inserted in s11 is not limited to the step immediately before the ladder circuit extracted in s5 this time, but may be anywhere between the step related to the ladder circuit including the coil of the contact belonging to the partial circuit whose selection is received in s1 and the step immediately before the ladder circuit extracted in s5 this time.

In the process shown in FIG. 10, with respect to the ladder diagram program 20, all the partial circuits whose selection is received in s1 can be replaced with the replacement circuit generated in s2. FIG. 11 illustrates a ladder diagram program obtained by editing the ladder diagram program shown in FIG. 7 by the process shown in FIG. 10. Therefore, even if the ladder diagram program 20 is edited by the process shown in FIG. 10, in the edited ladder diagram program 20 (the ladder diagram program 20 shown in FIG. 11), no bug occurs in step n+6 (corresponding to the step n+5 in FIG. 3).

The ladder diagram program creation assistance device 1 may be configured to cause the partial circuit selector 21 to execute a process shown in FIG. 12. FIG. 12 is a flowchart showing a candidate extraction process for extracting a candidate for a partial circuit to be replaced with respect to a ladder diagram program to be processed.

The partial circuit selector 21 extracts a partial circuit that appears more than a predetermined number of times (for example, 5 times) with respect to the ladder diagram program 20 to be processed (s21). The ladder diagram program creation assistance device 1 makes a list of the partial circuits extracted by the partial circuit selector 21 in s21, and performs an output process for displaying on the display of the display part 4 (s22).

FIG. 13 illustrates a screen displayed on the display in the output process of s22. As shown in FIG. 13, the display part 4 displays the partial circuits extracted in s21 and the numbers of appearances thereof in association with each other.

The ladder diagram program creation assistance device 1 may be configured to execute any of the processes shown in FIG. 4, FIG. 8 or FIG. 10 described above when the operator performs an operation of selecting a partial circuit on the screen shown in FIG. 13. The ladder diagram program creation assistance device 1 may also be configured to automatically select a partial circuit with the largest number of appearances and execute any of the processes shown in FIG. 4, FIG. 8 or FIG. 10 described above.

In any of the above examples, the ladder diagram program creation assistance device 1 determines that circuits having the same contacts and performing the same action are the same partial circuit even if the connection forms of the contacts do not match.

Taking as an example a partial circuit in which contact a whose variable is var1, contact b whose variable is var2 and contact c whose variable is var3 are connected in series, the ladder diagram program creation assistance device 1 determines that the circuits shown in (A) to (D) of FIG. 14 are the same partial circuit. (A) of FIG. 14 is a circuit in which contact a, contact b, and contact c are connected in series in this order. (B) of FIG. 14 is a circuit in which contact a, contact c, and contact b are connected in series in this order. (C) of FIG. 14 is a circuit in which contact b, contact c, and contact a are connected in series in this order. (D) of FIG. 14 is a circuit in which contact a, contact c, and contact b are connected in series in this order, and contact x whose variable is varX is inserted in series between contact c and contact b.

In the ladder diagram program creation assistance device 1, in a ladder diagram program edited by any of the processes shown in FIG. 4, FIG. 8 or FIG. 10 described above, when a replacement circuit being replaced is selected, an auxiliary circuit corresponding to the selected replacement circuit is displayed on the display of the display part 4 (see FIG. 15). FIG. 15 shows an example in which, when contact A whose variable is varA circled with dashed lines is selected, an auxiliary circuit corresponding to the selected contact A is displayed at the bottom of the screen (in an area surrounded by a rectangle shown in dashed lines).

In the ladder diagram program creation assistance device 1, when the operator performs editing for adding a step (ladder circuit) on the ladder diagram program edited by any of the processes shown in FIG. 4, FIG. 8 or FIG. 10, a replacement optimization process shown in FIG. 16 is performed.

The program editor 24 determines whether a ladder circuit of the step added by the operation of the operator includes a coil (target coil) of a contact belonging to the partial circuit replaced with the replacement circuit in any of the processes shown in FIG. 4, FIG. 8 or FIG. 10 (s31). If the ladder circuit of the step added this time does not include the target coil, the program editor 24 ends the present process. If the ladder circuit of the step added this time includes the target coil, the program editor 24 returns each replacement circuit appearing after the step added this time to the corresponding partial circuit (s32), and ends the present process.

Therefore, even if the operator performs editing for adding a step on the ladder diagram program edited by any of the processes shown in FIG. 4, FIG. 8 or FIG. 10, no bug occurs in the step in which the partial circuit is replaced with the replacement circuit in any of the processes shown in FIG. 4, FIG. 8 or FIG. 10. In addition, the operator may perform editing for adding a step (ladder circuit) without caring whether it is a ladder diagram program edited by any of the processes shown in FIG. 4, FIG. 8 or FIG. 10.

The replacement optimization process shown in FIG. 16 may be a process shown in FIG. 17. In FIG. 17, instead of the process related to s32, immediately after the step (ladder circuit) added this time, the corresponding auxiliary circuit is inserted (s33), and the present process is ended. Accordingly, the same effects as described above are obtained.

What is claimed is:

1. A ladder diagram program creation assistance device, comprising:
    a partial circuit selector, selecting a partial circuit comprising a plurality of contacts in a ladder diagram program;
    a replacement circuit generator, generating a replacement circuit comprising a smaller number of contacts than the partial circuit selected by the partial circuit selector;
    an auxiliary circuit generator, generating an auxiliary circuit that causes the replacement circuit generated by the replacement circuit generator to perform a same action as the partial circuit selected by the partial circuit selector; and
    a program editor, performing, on the ladder diagram program, a replacement process for replacing a partial circuit appearing in the ladder diagram program with the replacement circuit generated by the replacement circuit generator, and an auxiliary circuit insertion process for inserting the auxiliary circuit generated by the auxiliary circuit generator into the ladder diagram program;
    wherein if a step comprising a coil of a contact belonging to the partial circuit selected by the partial circuit selector appears in the ladder diagram program:
        the program editor prohibits replacement of the partial circuit appearing after the step with the replacement circuit in the replacement process; or
        the program editor inserts the auxiliary circuit generated by the auxiliary circuit generator between the step and a step in which the partial circuit first appears after the step in the auxiliary circuit insertion process.

2. The ladder diagram program creation assistance device according to claim 1, wherein the partial circuit selector selects, as the partial circuit, a circuit comprising a plurality of contacts that are input and specified.

3. The ladder diagram program creation assistance device according to claim 1, wherein the partial circuit selector extracts in the ladder diagram program, as the partial circuit, a circuit comprising a plurality of contacts and appearing more than a predetermined number of times.

4. The ladder diagram program creation assistance device according to claim 1, comprising an auxiliary circuit output part that, when the replacement circuit replaced by the program editor in the replacement process is selected in the ladder diagram program, outputs the auxiliary circuit corresponding to the selected replacement circuit.

5. The ladder diagram program creation assistance device according to claim 1, wherein, when a step comprising a coil of a contact belonging to the partial circuit replaced with the replacement circuit is added to the ladder diagram program, the program editor replaces the replacement circuit appearing after the added step with the corresponding partial circuit.

6. The ladder diagram program creation assistance device according to claim 1, wherein, when a step comprising a coil of a contact belonging to the partial circuit replaced with the replacement circuit is added to the ladder diagram program, the program editor inserts the auxiliary circuit generated by the auxiliary circuit generator immediately after the added step.

7. A ladder diagram program creation assistance method, comprising, executed by a computer:
- a partial circuit selection step of selecting a partial circuit comprising a plurality of contacts in a ladder diagram program;
- a replacement circuit generation step of generating a replacement circuit comprising a smaller number of contacts than the partial circuit selected in the partial circuit selection step;
- an auxiliary circuit generation step of generating an auxiliary circuit that causes the replacement circuit generated in the replacement circuit generation step to perform in a same action as the partial circuit selected in the partial circuit selection step; and
- a program editing step of performing, on the ladder diagram program, a replacement process for replacing the partial circuit appearing in the ladder diagram program with the replacement circuit generated in the replacement circuit generation step, and an auxiliary circuit insertion process for inserting the auxiliary circuit generated in the auxiliary circuit generation step into the ladder diagram program,
- wherein if a step comprising a coil of a contact belonging to the partial circuit selected by the partial circuit selection step appears in the ladder diagram program:
- the program editing step further prohibiting replacement of the partial circuit appearing after the step with the replacement circuit in the replacement process; or
- the program editing step further inserting the auxiliary circuit generated by the auxiliary circuit generation step between the step and a step in which the partial circuit first appears after the step in the auxiliary circuit insertion process.

8. A non-transitory computer readable recording medium storing a ladder diagram program creation assistance program, the ladder diagram program creation assistance program causing a computer to execute:
- a partial circuit selection step of selecting a partial circuit comprising a plurality of contacts in a ladder diagram program;
- a replacement circuit generation step of generating a replacement circuit comprising a smaller number of contacts than the partial circuit selected in the partial circuit selection step;
- an auxiliary circuit generation step of generating an auxiliary circuit that causes the replacement circuit generated in the replacement circuit generation step to perform a same action as the partial circuit selected in the partial circuit selection step; and
- a program editing step of performing, on the ladder diagram program, a replacement process for replacing the partial circuit appearing in the ladder diagram program with the replacement circuit generated in the replacement circuit generation step, and an auxiliary circuit insertion process for inserting the auxiliary circuit generated in the auxiliary circuit generation step into the ladder diagram program,
- wherein if a step comprising a coil of a contact belonging to the partial circuit selected by the partial circuit selection step appears in the ladder diagram program:
- the program editing step further prohibiting replacement of the partial circuit appearing after the step with the replacement circuit in the replacement process; or
- the program editing step further inserting the auxiliary circuit generated by the auxiliary circuit generation step between the step and a step in which the partial circuit first appears after the step in the auxiliary circuit insertion process.

9. The ladder diagram program creation assistance device according to claim 2, wherein the partial circuit selector extracts in the ladder diagram program, as the partial circuit, a circuit comprising a plurality of contacts and appearing more than a predetermined number of times.

10. The ladder diagram program creation assistance device according to claim 2, comprising an auxiliary circuit output part that, when the replacement circuit replaced by the program editor in the replacement process is selected in the ladder diagram program, outputs the auxiliary circuit corresponding to the selected replacement circuit.

11. The ladder diagram program creation assistance device according to claim 3, comprising an auxiliary circuit output part that, when the replacement circuit replaced by the program editor in the replacement process is selected in the ladder diagram program, outputs the auxiliary circuit corresponding to the selected replacement circuit.

12. The ladder diagram program creation assistance device according to claim 9, comprising an auxiliary circuit output part that, when the replacement circuit replaced by the program editor in the replacement process is selected in the ladder diagram program, outputs the auxiliary circuit corresponding to the selected replacement circuit.

* * * * *